Aug. 21, 1956 P. HÄRTER 2,759,405
FOLDING CAMERA CONSTRUCTION
Filed April 7, 1953 2 Sheets-Sheet 1

PAUL HARTER
INVENTOR.

BY

ATTORNEYS

Aug. 21, 1956 P. HÄRTER 2,759,405
FOLDING CAMERA CONSTRUCTION
Filed April 7, 1953 2 Sheets-Sheet 2
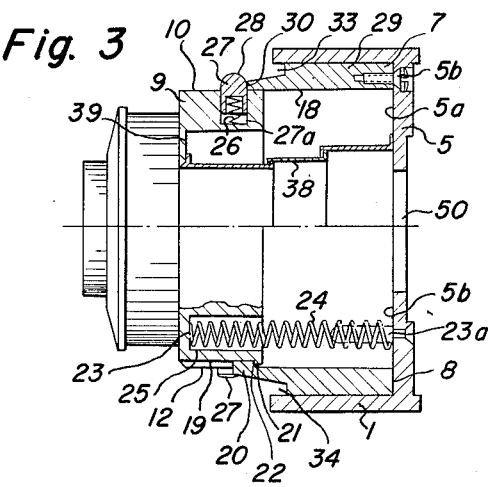
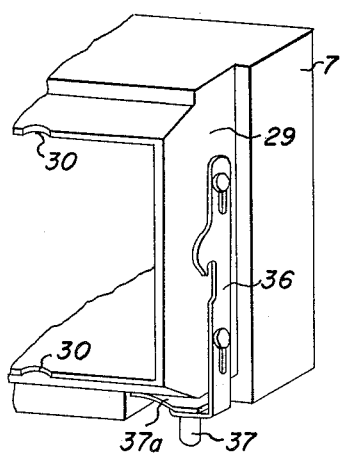
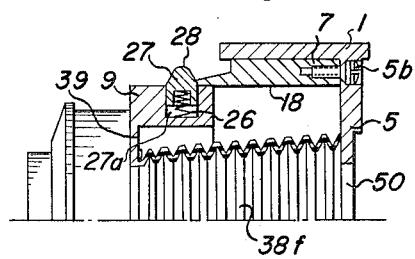
PAUL HARTER
INVENTOR.
BY
ATTORNEYS United States Patent Office 2,759,405
Patented Aug. 21, 1956

2,759,405

FOLDING CAMERA CONSTRUCTION

Paul Härter, Stuttgart-Wangen, Germany, assignor to Eastman Kodak Company, Rochester, N. Y., a corporation of New Jersey Application April 7, 1953, Serial No. 347,265

2 Claims. (Cl. 95—32)

This invention relates to photography, and more particularly to folding cameras in which the camera body may include telescoping tubular members, the outer one of which is articulated with a camera cover to move therewith to and from a picture-taking position.

In the past, folding cameras have been made in a number of different types, most of which had certain disadvantages. In one type, such cameras have been provided with a lens board or front which had to be supported relative to a camera bed or a camera body to hold the lens axially of the exposure aperture. In such cameras, the lens board is ordinarily connected by a bellows to the camera. These bellows are generally made up of a number of layers of material with leather or imitation leather on the outside and not only are they costly to construct but they are also readily susceptible to wear so that it is difficult to maintain a lighttight connection permanently. In a second type of folding camera, the camera objective has been carried by a telescoping member of rigid material, such as metal, which moves into the camera body and goes out from the camera body when the camera is in a picture-taking position. This type has the advantage of not requiring a flexible leather bellows but, on the other hand, it has the disadvantage that the camera objective is exposed to dust, dirt, and the like, whether the camera is opened or closed. My present invention is particularly directed to a camera structure which overcomes many of the disadvantages of both of the above types of cameras.

One object of my invention is to provide a connection between a camera body and an objective which is rigid and which is not readily susceptible to wear. Another object of my invention is to provide a camera with rigid telescoping tubular members for supporting the camera objective in which there is a hinged front cover which encloses the tubular connections and objective when the parts are moved to a folded position. Another object of my invention is to provide a flange around the camera front cover which extends substantially axially in such a manner that it may engage a groove around the camera body to assist in making a tight connection to prevent the entrance of dust and dirt. A still further object of my invention is to provide a sliding means and latch mechanism which will guide and hold the objective carrier rigidly in its outermost and picture-taking position. A still further object of my invention is to provide a camera construction which can readily be made lighttight, which is simple and easy to operate and which is reasonable in cost. Other objects will appear from the following specification, the novel features being particularly pointed out in the claims at the end thereof.

Coming now to the drawings wherein like reference characters denote like parts throughout:

Fig. 3 is a fragmentary cross section of parts of the camera shown in Fig. 1;

Fig. 4 is a fragmentary detail perspective showing a portion of the inner camera housing with a latching mechanism for the front cover; and Fig. 5 is a fragmentary sectional view through parts of the camera shown in Fig. 1 but showing a different embodiment in the connection between the objective carrier and the camera body.

Figure 1:
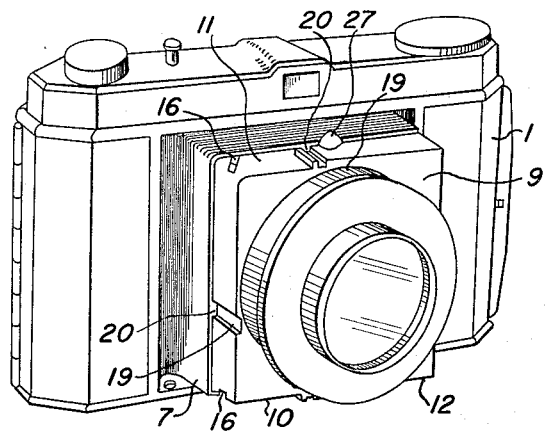
Fig. 1 is a perspective fragmentary view of a camera constructed in accordance with, and embodying a preferred form of, my invention. The camera cover is omitted from this view.
Figure 2:
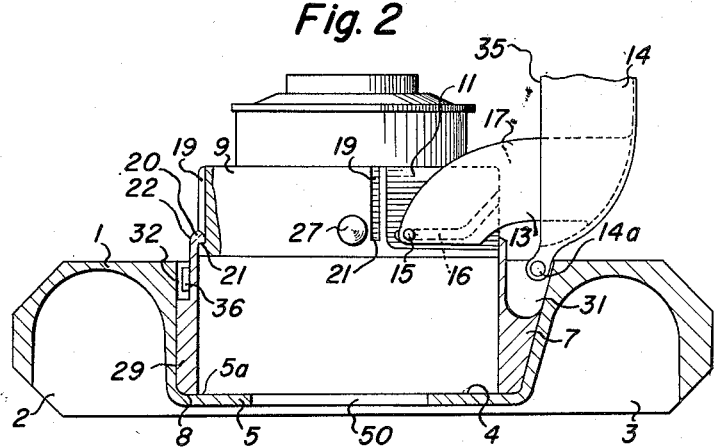
Fig. 2 is a fragmentary cross section of parts of the camera shown in Fig. 1.

My invention is particularly directed to a folding camera construction in which the camera is of the collapsible or folding type and in which an objective is rigidly supported in a picture-taking position by individual rigid telescoping sections. The objective carrier is coupled with a front cover in such a manner that they move together, the front cover turning about a hinge and the objective carrier moving axially through interengaging pins and slots. Thus, the camera objective is completely covered by the front cover when the camera is in a folded position and the camera can be readily brought into a picture-taking position by releasing the front cover latch and swinging it about its hinge. Another feature of my improved camera is that the front cover is provided with an inwardly-turned flange adapted to be received by a recess extending around the collapsible portion of the camera so that a tight connection excluding dust and dirt can be more readily obtained.

More specifically, the camera body 1 may include the usual spool chambers 2 and 3, there being a hollow space or opening 4 in the camera body of a generally tubular shape lying between the spool chambers 2 and 3. This hollowe space 4 has a back wall 5 containing an exposure aperture 5θ. The wall 5 further forms a guide for a film passing between the spool chambers 2 and 3.

The hollow space 4 receives an inner housing member 7 which rests against the framing surface 8. The inner housing member 7 may be considered to form a rectangular tube lying against an inner surface 5a of the wall 5 which is a part of the camera housing 1. Screws 5b or the like may be used to attach the inner housing 7 to the outer camera case 1, as shown in Fig. 3.

An objective carrier 9 is preferably a rigid molded part or casting arranged to slide in an inner housing 29 of the camera. Carrier 9 includes recesses on opposite walls 10 and 11. These parts receive projections 13 for the in-and-out motion of the camera front cover 14 and serve as sliding surfaces therefor. Lugs 15 extend from projections 13 carried by the front cover, these lugs lying in grooves 16 that are provided for this purpose in the opposite walls 10 and 11 of the tubular member 9. The inner surface 17 of the projections 13 rests on or against the outer surfaces 10 and 11 of the objective carrier 9 so that they may slide when the camera cover 14 is turned about its hinge 14a with the camera body 1.

The objective carrier 9 slides over longitudinal lips 20 of the inner housing 7 by means of the longitudinal grooves 19. The end surfaces 21 of these grooves in conjunction with the surfaces 22 of the longitudinal lips 20 form the stop for limiting the outward movement of the objective carrier 9. The outer ends 23 of helical springs 24 are inserted and anchored in bore holes 25 provided in the side walls 10 and 12 of the objective carrier 9. The inner ends of these springs 24 are placed over guide pins 23a and the back wall 5. Thus, these springs tend to thrust the objective carrier 9 outwardly when the camera front cover 14 is swung toward an open position and no undue strain is caused on the pin-and-slot connection between the objective carrier and the front cover.

In order to firmly hold the objective carrier in an open position, helical springs 26 push pins 27 in recesses 27a outwardly against portions of walls 20 and 29. The pins slide along the vertex of their rounded ends 28 on the inner surfaces of the side walls 29 of the inner housing 7 until they reach the recesses or perforations 30 in the side walls 29 and are pushed up into these perforations by the springs 26. The pins 27 are preferably slightly conical on the outside so that a wedge-shaped releasable locking of the parts 7 and 9 is accomplished and so that the objective carrier may be rigidly held in a picture-taking position.

When the inner housing 7 is assembled to the camera body 1, grooves or recesses 31, 32, 33 and 34 are formed all around the edges of the camera front cover leaving rabbets which are adapted to receive the edges of the camera cover 14. It is also noted that of these recesses, recess 31 carries the front cover hinge 14a. Grooves 32, 33 and 34 serve to receive flanges 35 on the front cover 14. The outer ends of these flanges extend substantially axially when the camera is closed, thus making a substantially dust-tight joint.

In addition, groove 32 receives a locking member 36 that may be arranged on the side wall 18 of the camera's inner housing 7. The locking member 36 includes a release button 37 which projects from the outer camera casing 1, and there is a spring member 37a normally thrusting the release button to its outermost position. A complementary-shaped lock on the front cover may engage the locking member 36 when the camera is closed.

While it is quite possible to provide a suitable light-tight joint between the slidable connections of the objective carrier 9, the inner casing 7, and the outer casing 1, it is generally preferable to have a supplementary light-protecting device 38 which may be in the form of a plurality of interengaging telescoping tubes, as shown in Fig. 3. If desired, in place of the interengaging tubes, a bellows 38f may be employed, as shown in Fig. 5. Such a bellows can be inexpensively made of molded rubber or rubber substitute and requires no leather covering. As pointed out above, if considerable care is employed in the manufacture of the camera, it is not essential that either of these extra light-connecting parts be employed.

The operation of a camera constructed in accordance with the preferred embodiments described above may be as follows: the front cover is released by pressing the release button 37 which projects from the outer casing 1. This releases the camera bed and the springs 24 thrust the objective carrier and bed outwardly until the camera front reaches an open position, at which time the push buttons 27 snap into the recesses or grooves 30, thereby holding the camera in an erect picture-taking position. When it is desired to close the camera, the push buttons 27 are pressed inwardly and the objective carrier 9 is moved against the pressure of the springs 24, thus causing the projections 15 to move through the cam slots in the objective carrier 9 as the parts move to a collapsed or folded position. In this position, the edges of the camera bed lie in the grooves 31, 32, 33 and 34, and a relatively dust-proof connection is provided to protect the objective while the camera remains folded.

Having thus described my invention, what I claim is new and desire to secure by Letters Patent of the United States is:

1. A folding camera construction comprising a camera body having a recess therein, a cover hingedly attached thereto, projections on each side of the cover, an inner casing having exterior walls to fit into and fill the full depth of the recess in the camera body and including inner generally rectangular pairs of parallel walls extending from front to back of the camera body recess and constituting a four-sided slideway in the camera body, an objective carrier including generally rectangular walls closely fitting into and engaging the pairs of parallel walls of the slideway and adapted to move back and forth therein, said objective carrier walls including cam slots, interengaging grooves on the objective carrier and lugs on the inner casing for guiding and directing the movement of the objective carrier relative to the inner casing, the grooves extending outwardly from a position near the rear edge of the objective carrier whereby a light-tight connection may be maintained between the interfitting four-sided slideway and the objective carrier, the lugs on the inner casing limiting the outward movement of the lens carrier by engaging the ends of the grooves, maintaining at all times interengaging surfaces to guide the objective carrier accurately in an axial direction by the four-sided slideway, pin and slot connections between the cover projections and the objective carrier for moving the latter by the former, springs acting on the objective carrier and camera body tending to thrust the objective carrier from the camera body by sliding the former on the slideway of the inner casing, recesses in the inner casing on opposite sides thereof, and spring-pressed knobs carried by the objective carrier and engageable in recesses for definitely locking the objective carrier in a fixed relation to the inner casing slideway.

2. A folding camera construction as defined in claim 1 characterized in that the body and inner casing include between them a groove extending about all four sides of the camera opening, the hinged cover having inturned edges adapted when the cover is closed to be received in the grooves to make an interlocking connection therewith.

References Cited in the file of this patent

UNITED STATES PATENTS

| 524,142 | Hogelein | Aug. 7, 1894 |
| 2,187,093 | Peterson | Jan. 16, 1940 |
| 2,208,799 | Lessler et al. | July 23, 1940 |
| 2,297,494 | Nerwin | Sept. 29, 1942 |
| 2,327,797 | Hutchins | Aug. 24, 1943 |
| 2,477,904 | Schwartz | Aug. 2, 1949 |

FOREIGN PATENTS

| 801,963 | Germany | Jan. 29, 1951 |